(12) United States Patent
Held

(10) Patent No.: US 10,778,272 B2
(45) Date of Patent: Sep. 15, 2020

(54) MICROPHONE HOLDER FOR RADIO DEVICES

(71) Applicant: Wolfgang Held, Hard (AT)

(72) Inventor: Wolfgang Held, Hard (AT)

(*) Notice: Subject to any disclaimer, the term of this patent is extended or adjusted under 35 U.S.C. 154(b) by 0 days.

(21) Appl. No.: 16/479,230

(22) PCT Filed: Feb. 7, 2018

(86) PCT No.: PCT/EP2018/053074
§ 371 (c)(1),
(2) Date: Jul. 19, 2019

(87) PCT Pub. No.: WO2018/146149
PCT Pub. Date: Aug. 16, 2018

(65) Prior Publication Data
US 2019/0386695 A1    Dec. 19, 2019

(30) Foreign Application Priority Data
Feb. 8, 2017    (DE) .................. 10 2017 102 464

(51) Int. Cl.
*H04M 1/05*    (2006.01)
*H04B 1/3827*    (2015.01)
*H01Q 1/24*    (2006.01)
*H04B 1/03*    (2006.01)
*H04R 1/08*    (2006.01)
*H04R 1/04*    (2006.01)

(52) U.S. Cl.
CPC .......... *H04B 1/3833* (2013.01); *H01Q 1/243* (2013.01); *H04B 1/03* (2013.01); *H04R 1/083* (2013.01); *H01R 2201/02* (2013.01); *H04R 1/04* (2013.01); *H04R 2499/11* (2013.01)

(58) Field of Classification Search
CPC ...................................... H04R 1/105
See application file for complete search history.

(56) References Cited

U.S. PATENT DOCUMENTS

| 4,788,724 A * | 12/1988 | Lazzeroni ............ A42B 3/30 |
| | | 2/422 |
| 6,272,361 B1 * | 8/2001 | Courtis .............. H04M 1/271 |
| | | 455/569.1 |
| 7,257,422 B2 * | 8/2007 | Loprete ............. H04M 1/05 |
| | | 379/420.04 |
| 2003/0160725 A1 * | 8/2003 | Baxter ............ H04B 1/3805 |
| | | 343/702 |
| 2005/0003849 A1 | 1/2005 | Ramian | |
| 2018/0352316 A1 * | 12/2018 | Kucharko ......... H04R 1/1041 |

FOREIGN PATENT DOCUMENTS

| DE | 20 2015 000709 U1 | 3/2015 |
| EP | 2 006 959 A2 | 12/2008 |

* cited by examiner

*Primary Examiner* — Cindy Trandai
(74) *Attorney, Agent, or Firm* — John Alumit

(57) ABSTRACT

The invention relates to a microphone holder for attachment to the housing of a radio device, which is provided with a rod antenna joined thereto, wherein the microphone holder is embodied as a clip, which can be placed on the radio device housing and which surrounds the rod antenna, and includes a receiving pocket for the microphone, a sleeve for receiving the rod antenna, and a clamp for firmly clamping the microphone holder to the radio device housing.

7 Claims, 7 Drawing Sheets

MICROPHONE HOLDER FOR RADIO DEVICES

The invention relates to a microphone holder, which is mounted on a radio device, as defined by the preamble to claim 1.

Such holders are employed for instance in fire department radio devices.

From the prior art, a suspension device for a microphone is known from DE 26 18 113 C3, by which suspension device the microphone can be suspended by means of a holder secured to a wall.

JP 2007 019 783 A describes a clip, connected to a radio device, for securing the radio device to a piece of clothing; the clip is fixed to the radio device with the aid of the antenna.

In US 2003/0160725 A1, a housing with a speaker and a microphone is described that is connected to a radio device via a cord; the housing has a clip on its back side for securing to a piece of clothing.

DE 20 2015 000 709 U1 describes an apparatus for secure disposition of a microphone, provided with a clamplike securing device, to an antenna of a radio device; the apparatus is formed of a partial, detachable sheathing of plastic material, on which the clamplike securing device is located, preferably in form-locking fashion.

With the above prior art as the point of departure, the invention has the object of creating a microphone holder which can be attached to the radio device housing and at the same time ensures protection of the rod antenna against breaking off This object is attained with the features of claim 1.

According to the invention, this involves a microphone holder for mounting on the housing of a radio device, the radio device being provided with a rod antenna connected to it. The microphone holder is embodied as a clip that can be mounted on the radio device housing and that surrounds the rod antenna. The clip essentially consists of three parts joined together, specifically a receiving pocket for the microphone, a sleeve for receiving the rod antenna, and a clamp for firmly clamping the microphone holder to the radio device housing.

Further suitable and advantageous embodiments will be learned from the dependent claims.

In a first embodiment of the invention, which is advantageous in terms of function, the receiving pocket has a recess in the handle. The microphone can therefore be more easily taken out of the receiving pocket.

In a further embodiment of the invention, the sleeve is provided with a reinforcing wall that is braced on the radio device housing; the wall merges with the clamp. As a result, the stability of the microphone holder is further enhanced.

In a third embodiment of the invention, the sleeve is provided with guide grooves for guidance on parts of the radio device housing. This makes improved locking of the microphone holder possible.

In a fourth advantageous embodiment of the invention, a slit sheath element is inserted into the sleeve in order to adapt to the rod antennas. As a result, the sleeve can be adapted to slightly varying diameters of the rod antennas.

In a further embodiment of the invention, both the sleeve itself and the sheath element are slit in order to adapt to the diameter of the rod antenna.

In a sixth advantageous embodiment of the invention, the sheath element consists of elastic material and can have various wall thicknesses, as a result of which even better adaptation to different diameters of the antenna is possible.

The invention will be described in further detail in terms of the exemplary embodiments shown in the drawings. In the drawings.

Figure 1:
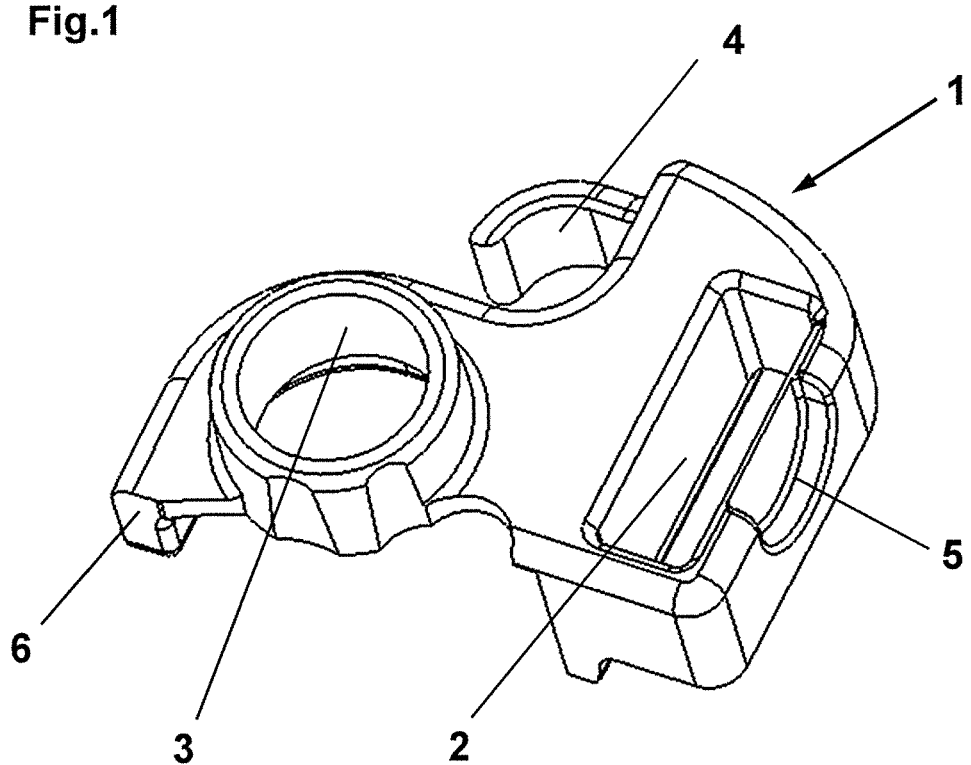
FIG. 1 is a perspective view of a microphone holder viewed obliquely from above.
Figure 2:
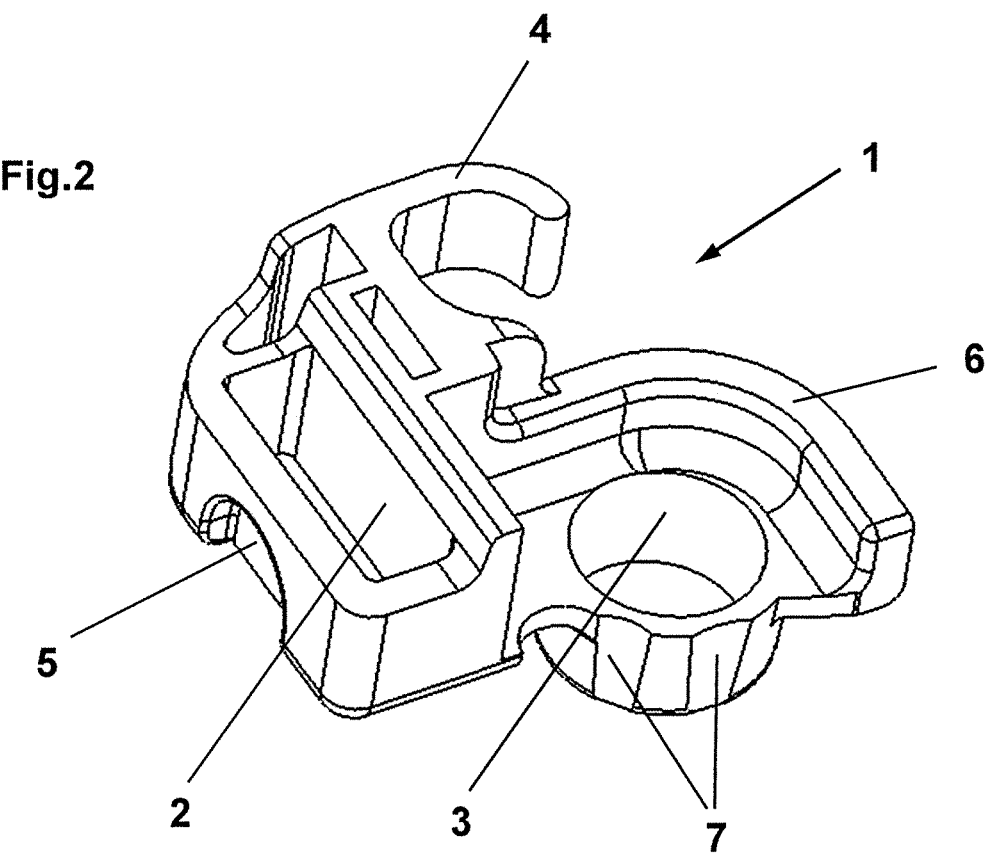
FIG. 2 is a perspective view of the microphone holder viewed obliquely from below.
Figure 3:
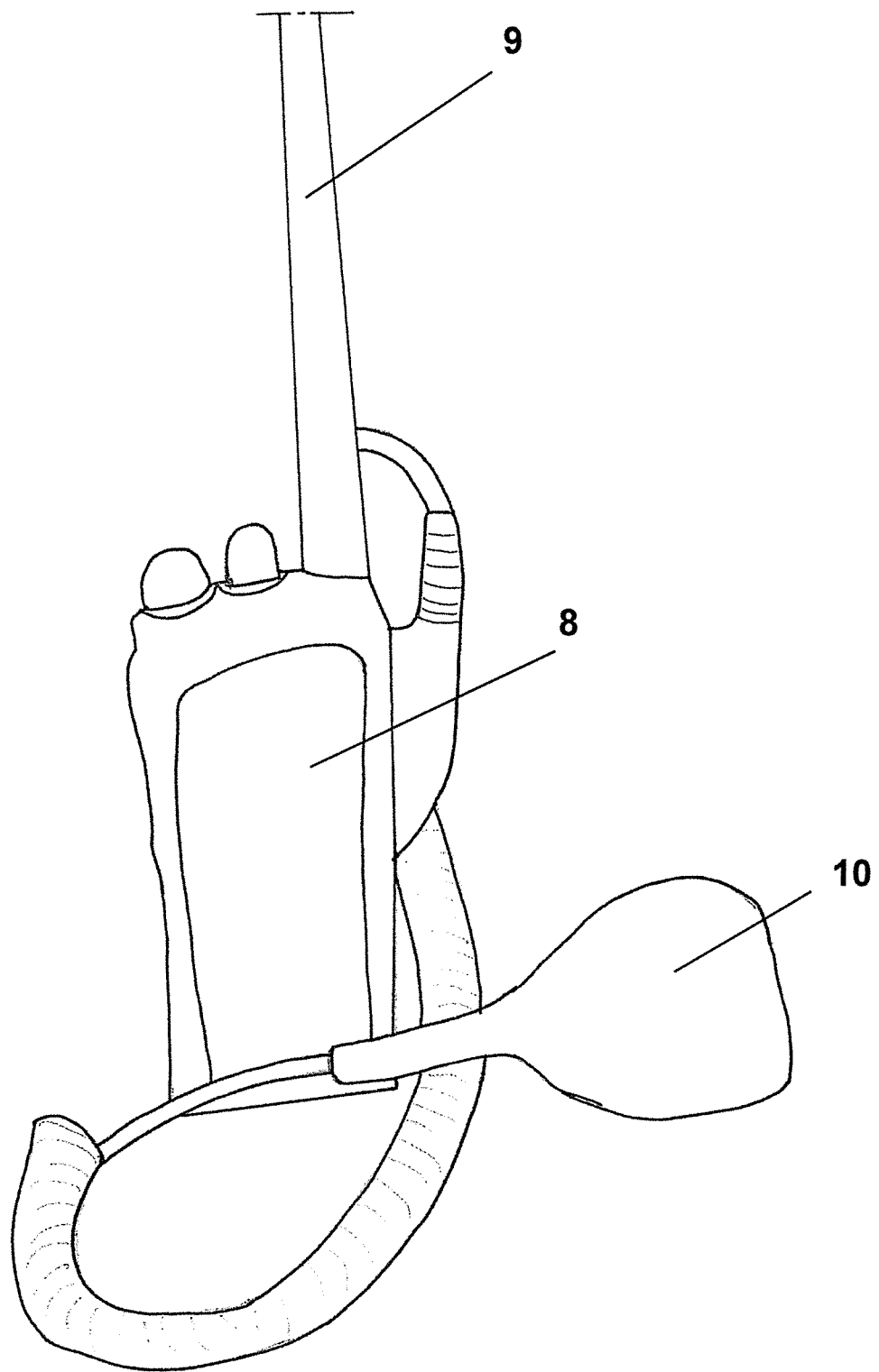
FIG. 3 is a photograph of a radio device that is equipped with a rod antenna and a microphone.
Figure 4:
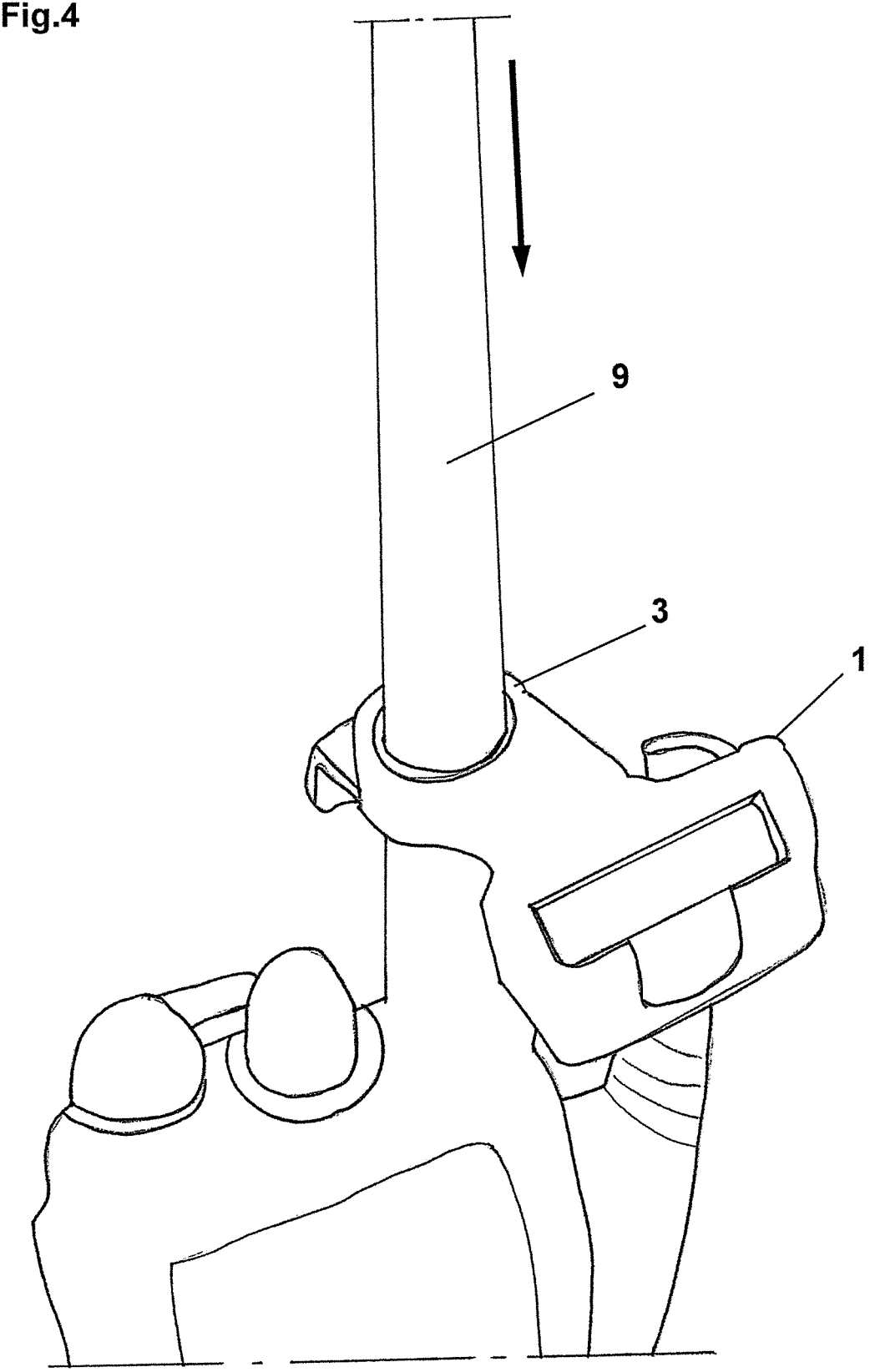
FIG. 4 is a photograph as in FIG. 3 with a microphone holder of the invention that is guided for the rod antenna.
Figure 5:
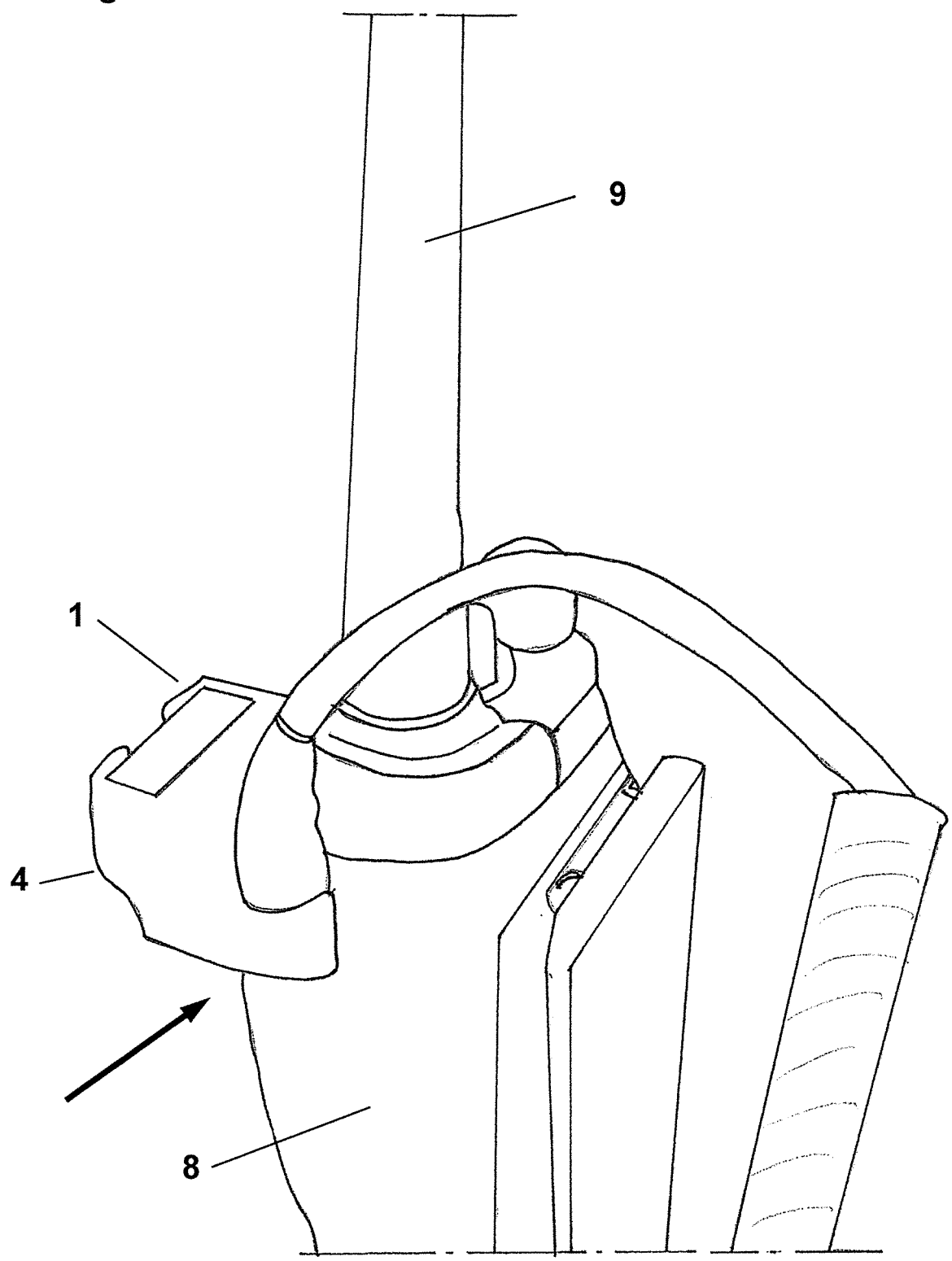
FIG. 5 is a photograph in which the microphone holder is placed on the radio device housing and clamped to it.
Figure 7:
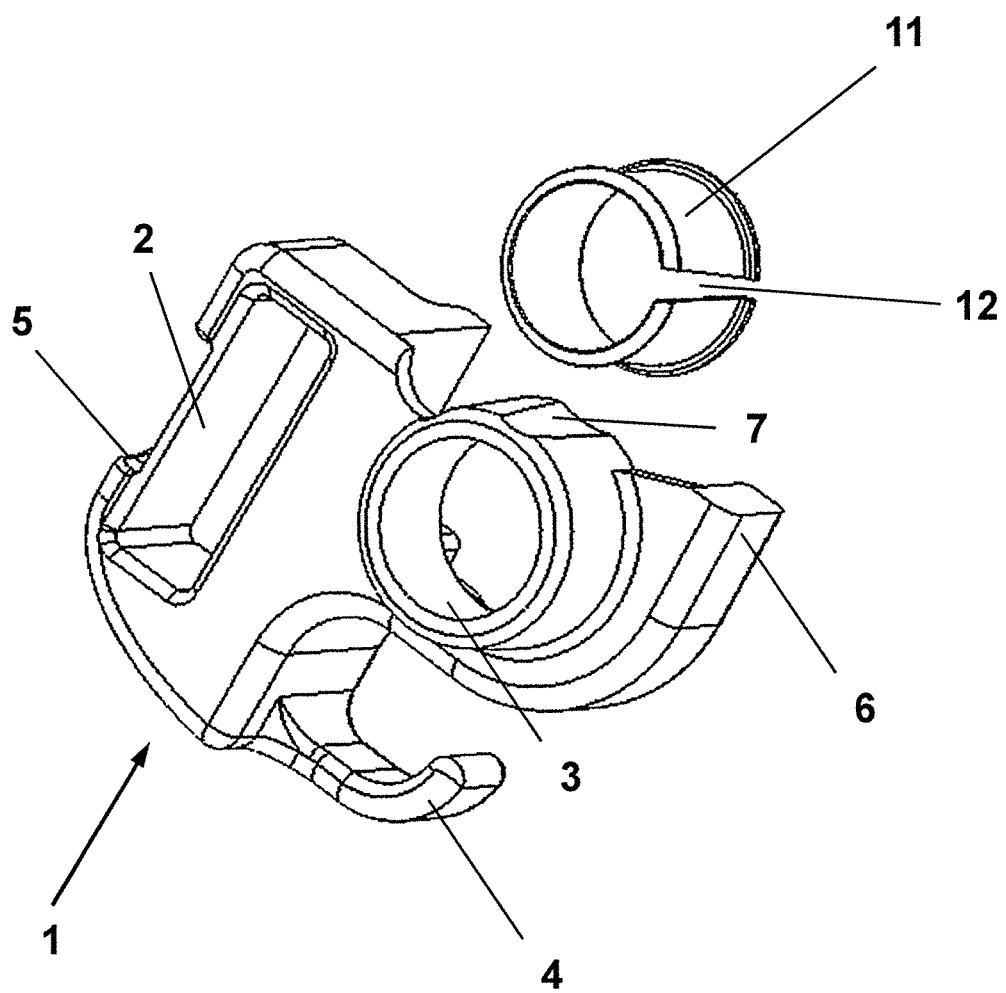
Figure 8:
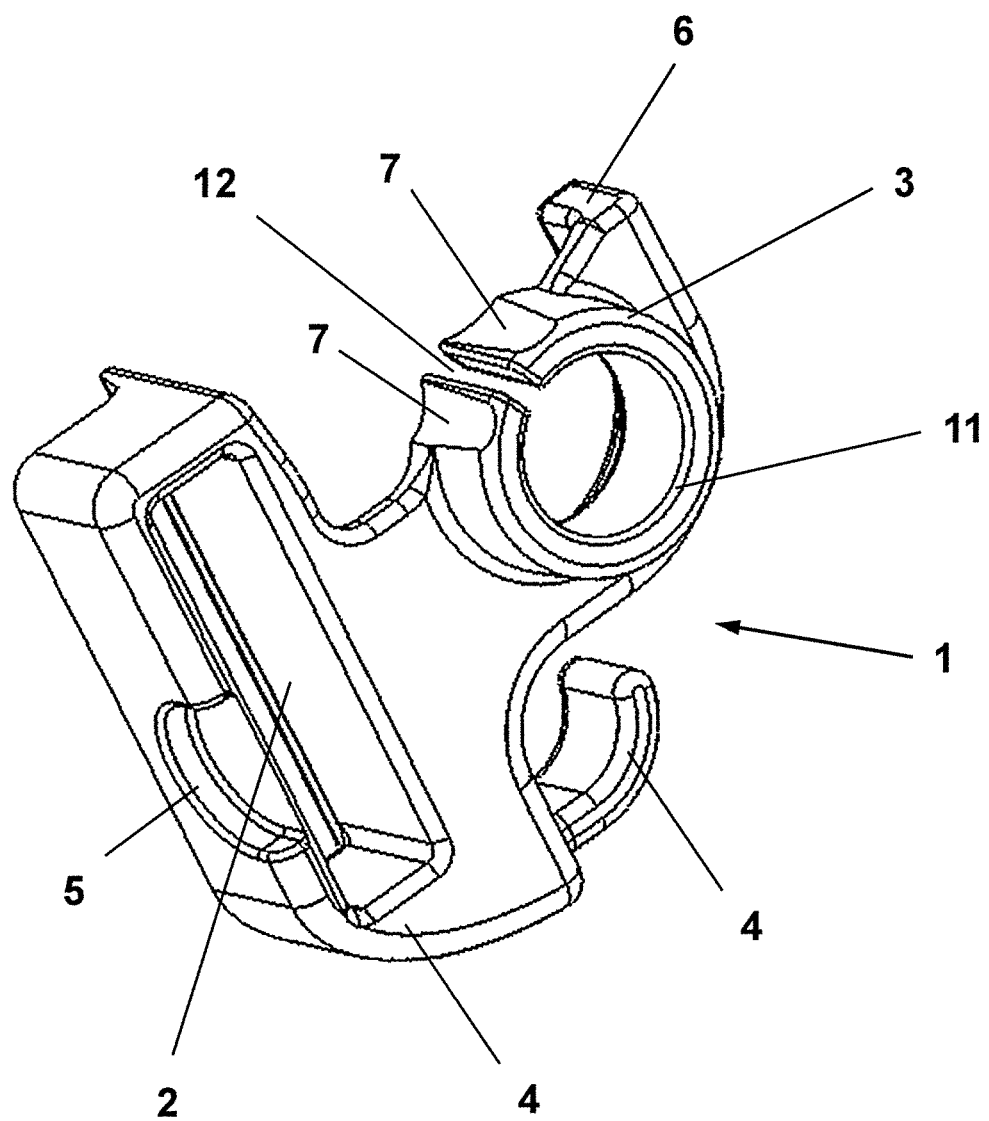

FIG. 7 is a photograph of a microphone holder, similar to FIGS. 1 and 2, in which a sheath element slit in the direction of the rod antenna is inserted into the sleeve for the sake of adaptation of the sleeve to the diameter of the rod antenna; and FIG. 8 is a perspective view of a microphone holder, similar to FIG. 7, in which both the sleeve itself and the sheath element are slit for the sake of adaptation to the diameter of the rod antenna.

The microphone holder 1 shown in FIGS. 1 and 2 consists essentially of three parts connected to one another, namely a receiving pocket 2 for a microphone, a sleeve 3 for receiving a rod antenna 9, and a clamp 4 for firmly clamping the microphone holder 1 to a radio device housing 8.

The receiving pocket 2 is provided with a recess 5 in the handle, to make it easier to take out up the microphone. The sleeve 3 is provided with a reinforcing wall 6, braced on the radio device housing 8, which wall merges with the elastically deformable, open clamp 4. The sleeve 3 is furthermore equipped with guide grooves 7 for guidance on parts of the radio device housing.

The microphone holder 1 consists of high-strength, temperature-resistant material.

Figure 6:
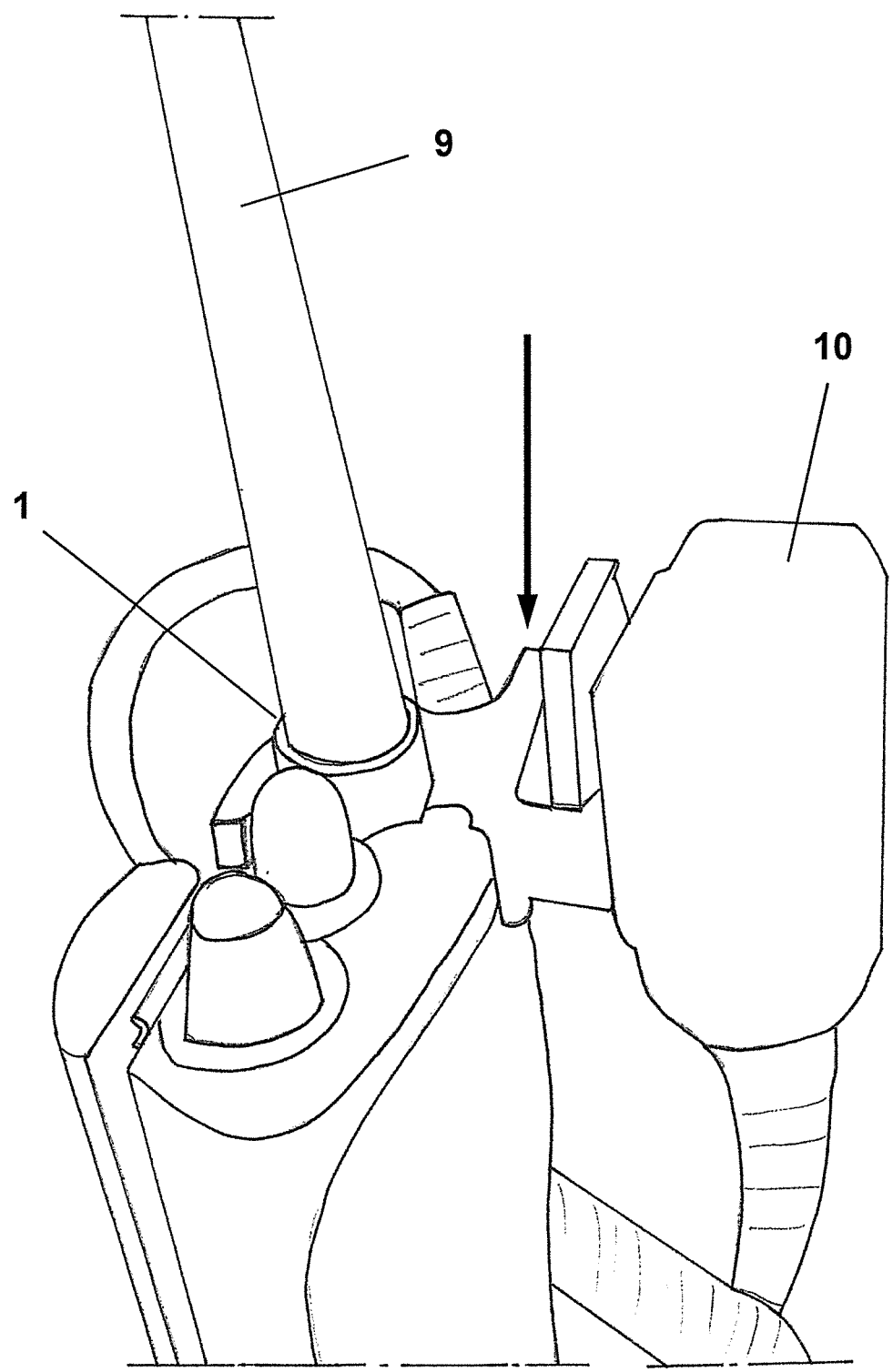
FIG. 6 is a photograph with the microphone holder placed on the housing and clamped, with a microphone inserted into the microphone holder.

FIGS. 3 through 6 show how the microphone holder 1, embodied as a clip, is assembled. The fundamentals are, as in FIG. 3, a radio device with a radio device housing 8, a rod antenna 9 connected to the radio device housing, for instance by means of screw fastening or a bayonet closure, and a microphone 10. The microphone holder of the invention is fitted according to FIG. 4 with its sleeve 3 over the rod antenna 9, and according to FIG. 5 it is placed on the radio device housing 8 and locked with the clamp 4. In FIG. 6, the microphone 10 can be inserted into the receiving pocket 2.

Further embodiments of the microphone holder are shown in FIGS. 7 and 8.

FIG. 7 shows a microphone holder 1 similar to FIGS. 1 and 2, in which a sheath element 11, slit at 12 in the direction of the rod antenna 9, for adaptation of the sleeve 3 to the diameter of the rod antenna 9, is inserted into the sleeve 3. It has been found that in practice, the rod antennas 9 have slightly varying diameters. The sheath element 11 consists of an elastic material, can have various wall thicknesses, and is suitable for adapting the holder 1 to various diameters of the antenna 9, of the kind that occur for instance from tolerances in manufacture or the use of different antennas.

In FIG. 8, both the sleeve 3 itself and the sheath element 11 are slit at 12 for adaptation to the diameter of the rod antenna 9. To compensate for slight tolerances of the antenna diameter, it can also suffice to use of only the slit sleeve 3. By means of the slit 12 in the sleeve and/or in the sheath element 11, an additional tolerance compensation is achieved, since both, in the case of relatively large diameters of the antenna 9, permit a likewise large opening, making it easier to slip them onto the antenna 9 while still clamping them securely to the antenna.

LIST OF REFERENCE NUMERALS

1 Microphone holder
2 Receiving pocket
3 Sleeve
4 Clamp
5 Recess in the handle
6 Reinforcing wall
7 Guide grooves
8 Radio device housing
9 Rod antenna
10 Microphone
11 Sheath element
12 Slit

The invention claimed is:

1. A microphone holder (1) for attachment to the housing (8) of a radio device, which is provided with a rod antenna (9) joined thereto, characterized in that the microphone holder (1) is embodied as a clip, which can be placed on the radio device housing (8) and which surrounds the rod antenna (9), and includes a receiving pocket (2) for the microphone (10), a sleeve (3) for receiving the rod antenna (9), and a clamp (4) for firmly clamping the microphone holder (1) to the radio device housing (8).

2. The microphone holder of claim 1, characterized in that the receiving pocket (2) has a recess (5) in the handle.

3. The microphone holder of claim 1, characterized in that the sleeve (3) is provided with a reinforcing wall (6) which is braced on the radio device housing (8) and merges with the clamp (4).

4. The microphone holder of one of claim 1, characterized in that the sleeve (3) is provided with guide grooves (7) for guidance on parts of the radio device housing.

5. The microphone holder of one of claim 1, characterized in that a sheath element (11), slit at (12) in the direction of the rod antenna (9), is inserted into the sleeve (3) for adaptation of the sleeve (3) to the diameter of the rod antenna (9).

6. The microphone holder of claim 5, characterized in that both the sleeve (3) itself and the sheath element (11) are slit at (12) for adaptation to the diameter of the bar antenna (9).

7. The microphone holder of one of claim 5, characterized in that the sheath element (11) consists of elastic material and can have various wall thicknesses.

* * * * *